(12) United States Patent
Lee

(10) Patent No.: US 11,995,276 B2
(45) Date of Patent: May 28, 2024

(54) TOUCH SENSITIVE STRUCTURE AND TOUCH SENSITIVE PROCESSING APPARATUS, METHOD AND ELECTRONIC SYSTEM THEREOF

(71) Applicant: EGALAX_EMPIA TECHNOLOGY INC., Taipei (TW)

(72) Inventor: Cheng-Han Lee, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/089,744

(22) Filed: Dec. 28, 2022

(65) Prior Publication Data
US 2023/0229273 A1    Jul. 20, 2023

Related U.S. Application Data

(60) Provisional application No. 63/300,061, filed on Jan. 17, 2022.

(51) Int. Cl.
*G06F 3/044* (2006.01)
*G06F 3/041* (2006.01)

(52) U.S. Cl.
CPC ........ *G06F 3/0443* (2019.05); *G06F 3/04166* (2019.05)

(58) Field of Classification Search
None
See application file for complete search history.

(56) References Cited

U.S. PATENT DOCUMENTS

| 11,460,919 | B1 * | 10/2022 | Gashler | G06F 3/0346 |
| 2014/0184951 | A1 * | 7/2014 | Yeh | G06F 3/0412 349/12 |
| 2016/0209441 | A1 * | 7/2016 | Mazzeo | G06F 3/0447 |
| 2022/0005790 | A1 | 1/2022 | Watanabe et al. | |
| 2022/0291778 | A1 * | 9/2022 | Williams | G06F 3/0446 |

FOREIGN PATENT DOCUMENTS

| CN | 106471452 B | * | 7/2019 | ............ G01B 7/003 |
| CN | 104750309 B | * | 12/2019 | ............ G06F 3/016 |
| CN | 112673411 |   | 10/2023 | |

\* cited by examiner

*Primary Examiner* — Duane N Taylor, Jr.
(74) *Attorney, Agent, or Firm* — WPAT, PC

(57) ABSTRACT

A touch sensitive structure, comprising: two electrode layers for forming a touch area; and a touch button outside of the touch area. The touch button comprises two button electrodes and two corresponding wires in these two electrode layers, respectively; and a conductive layer being arranged in between a finger on top of the touch sensitive structure and one of the two wires.

20 Claims, 13 Drawing Sheets

TOUCH SENSITIVE STRUCTURE AND TOUCH SENSITIVE PROCESSING APPARATUS, METHOD AND ELECTRONIC SYSTEM THEREOF

CROSS REFERENCE TO RELATED PATENT APPLICATION

This patent application is based on a provisional patent application No. 63/300,061 filed on Jan. 17, 2022.

FIELD OF THE INVENTION

The present invention relates to touch sensitive function, and more particularly, interference resistance of touch sensitive function.

BACKGROUND OF THE INVENTION

Touch sensitive apparatus utilizing capacitive sensing principles becomes one of common input apparatus of modern electronic systems. By detecting variations of weak currents, it is used to determine whether external conductive objects such as fingers approaches or touches touch electrodes. However, the detected variations of currents are very tiny by utilizing capacitive sensing principles, it is prone to be electromagnetic interfered from surrounding environment. Hence, it is desired to have a mechanism to enhance resistances to interference such that it may prevent the touch sensitive apparatus for receiving wrong instructions.

SUMMARY OF THE INVENTION

According to an embodiment, a touch sensitive structure is provided. The touch sensitive structure, comprising: a first electrode layer, further comprises multiple first electrodes in parallel to a first axis in a touch area; a second electrode layer, further comprises multiple second electrodes in parallel to a second axis in the touch area; a touch button outside of the touch area, the touch button further comprises a first button electrode in the first electrode layer and a second button electrode in the second electrode layer, wherein a shape and a position of the first button electrode are corresponding to the second button electrode; a first wire, in the first electrode layer and outside the touch area, for connecting the first button electrode; a second wire, in the second electrode layer and outside the touch area; and a conductive layer being arranged in between an external conductive object on top of the touch sensitive structure and at least one of following: the first wire; and the second wire.

Preferably, in order to prevent the second wire being electromagnetic interfered by the external conductive object, wherein when the first wire is closer to the external conductive object than the second wire, the conductive layer is arranged in between the external conductive object and the second wire, the conductive layer is not arranged in between the external conductive object and the first wire.

Preferably, in order to prevent the electromagnetic interferences from the external conductive object, wherein the conductive layer is connected to a direct current voltage.

Preferably, in order to prevent the electromagnetic interferences from the external conductive object, wherein the conductive layer is electrically coupled to the first wire.

Preferably, in order to prevent the electromagnetic interferences from the external conductive object, wherein when the conductive layer is arranged in between the external conductive layer and the first and the second wires, voltage of the conductive layer is floating.

Preferably, in order to detect the second touch button simultaneously, the touch sensitive structure further comprises: a second touch button, outside the touch area, further includes a third button electrode in the first electrode layer and a fourth button electrode in the second electrode layer; a fourth wire, in the second electrode layer and outside the touch area, for connecting the fourth button electrode, and wherein the first wire is further configured to connect the third button electrode, wherein the conductive layer is arranged in between the external conductive object and at least one combination of following: a first combination including the first wire; and a second combination including the second and the fourth wires.

Preferably, in order to prevent electromagnetic interferences from the external conductive object, wherein when the first combination is closer to the external conductive object than the second combination, the conductive layer is arranged in between the external conductive object and the second combination, the conductive layer is not arranged in between the external conductive object and the first combination.

Preferably, in order to prevent the electromagnetic interferences from the external conductive object, wherein the conductive layer is connected to a direct current voltage.

Preferably, in order to prevent the electromagnetic interferences from the external conductive object, wherein the conductive layer is electrically coupled to the first combination.

Preferably, in order to prevent the electromagnetic interferences from the external conductive object, wherein when the second combination is closer to the external conductive object than the first combination, the conductive layer is arranged in between the external conductive object and the first combination, the conductive layer is not arranged in between the external conductive object and the second combination, wherein the conductive layer is connected to a direct current voltage.

Preferably, in order to prevent the electromagnetic interferences from the external conductive object, wherein when the conductive layer is arranged in between the external conductive layer and the first and the second combinations, voltage of the conductive layer is floating.

According to an embodiment of the present application, a touch sensitive structure is provided. The touch sensitive structure, comprising: an electrode layer, which further comprises multiple first electrodes in parallel to a first axis and multiple second electrodes in parallel to a second axis in a touch area; a touch button outside the touch area, which further comprises a first button electrode and a second button electrode in the electrode layer, wherein a shape and a position of the first button electrode are corresponding to the second button electrode; a first wire, outside the touch area and in the electrode layer, for connecting to the first button electrode; a second wire, outside the touch area and in the electrode layer, for connecting to the second button electrode; and a conductive layer, being arranged in between an external conductive object on top of the touch sensitive structure and the first and the second wires.

Preferably, in order to prevent electromagnetic interference from the external conductive object, the touch sensitive structure further comprises: a second touch button outside the touch area, which further comprises a third button electrode and a fourth button electrode in the electrode layer, wherein a shape and a position of the third button electrode are corresponding to the fourth button electrode; and a fourth wire, outside the touch area and in the electrode layer, for connecting to the fourth button electrode, wherein the first wire is further configured for connecting to the third button electrode, wherein the conductive layer is arranged in between the external conductive object and the first, the second, and the fourth wires.

According to an embodiment of the present application, a touch sensitive processing apparatus is provided for controlling the touch sensitive structure. The touch sensitive processing apparatus, comprising: an interconnection network for connecting to the first electrodes, the second electrodes, the first wire, and the second wire; a driving circuit module, configured for providing a driving signal via the interconnection network, the first wire and the first button electrode; a sensing circuit module, configured for sensing the driving signal via the interconnection network, the second wire and the second button electrode; and a processor module, configured for executing instructions stored in non-volatile memory to realize: determining whether the touch button is being touched based on changes of the driving signal sensed by the sensing circuit module.

According to an embodiment of the present application, a touch sensitive processing apparatus is provided for controlling the touch sensitive structure. The touch sensitive processing apparatus, comprising: an interconnection network for connecting to the first electrodes, the second electrodes, the first wire, and the fourth wire; a driving circuit module, configured for providing a driving signal via the interconnection network, the first wire and the third button electrode; a sensing circuit module, configured for sensing the driving signal via the interconnection network, the fourth wire and the fourth button electrode; and a processor module, configured for executing instructions stored in non-volatile memory to realize: determining whether the second touch button is being touched based on changes of the driving signal sensed by the sensing circuit module.

According to an embodiment of the present application, an electrode system is provided. The electronic system comprises the touch sensitive structure and the touch sensitive processing apparatus.

Preferably, the electronic system further comprises a host for controlling the electronic system, wherein the processor module is further configured for reporting to the host when it is determined that the touch button is touched.

According to an embodiment of the present application, a touch sensitive processing method is provided for controlling the touch sensitive structure. The touch sensitive processing method comprising: providing a driving signal via the interconnection network, the first wire and the first button electrode; sensing the driving signal via the interconnection network, the second wire and the second button electrode; and determining whether the touch button is being touched based on changes of the driving signal sensed by the sensing circuit module.

According to an embodiment of the present application, a touch sensitive processing method is provided for controlling the touch sensitive structure. The touch sensitive processing method comprising: providing a driving signal via the interconnection network, the first wire and the third button electrode; sensing the driving signal via the interconnection network, the fourth wire and the fourth button electrode; and determining whether the second touch button is being touched based on changes of the driving signal sensed by the sensing circuit module.

Preferably, the touch sensitive processing method further comprises reporting to a host when it is determined that the touch button is touched.

The present application provides a mechanism to enhance interference resistance for protecting a wire harness of a touch button. It prevents the touch sensitive processing apparatus receives wrong instruction when a finger is placed on top of the wire harness.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
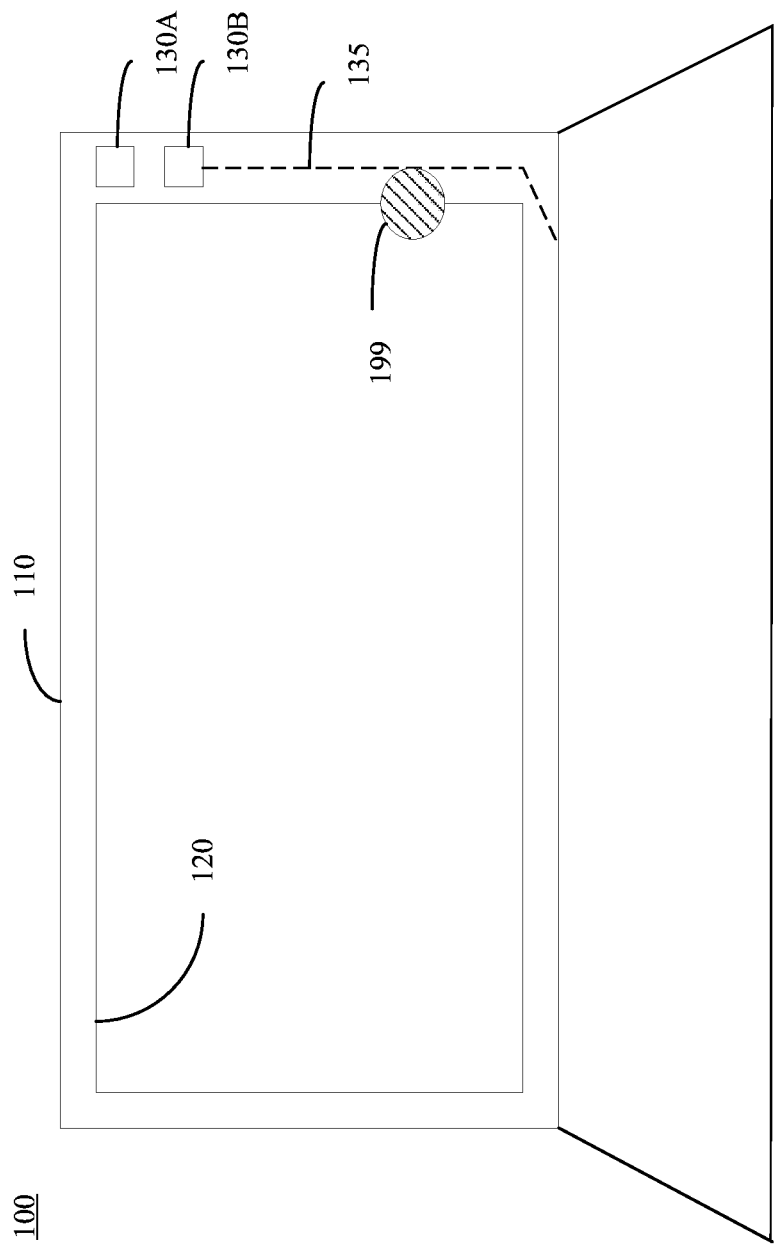
FIG. 1 depicts a diagram of an electronic system 100 in accordance with an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which depicts a diagram of an electronic system 100 in accordance with an embodiment of the present application. The electronic system 100 may be a normal laptop computer which is designed to have an upper part and a lower part. The lower part usually includes a keyboard and a touch panel and electronic devices comprising battery and a central processing unit inside. The upper part 110 may usually includes a touch screen 120.

The upper part 110 may include one or more functional buttons 130, e.g., the two touch buttons 130A and 130B as shown in FIG. 1. A user may use these functional buttons to directly control some functions, e.g., power switch of the electronic system 100, brightness of the touch screen 120 or other functions.

In one embodiment, button electrodes of the touch buttons 130 and touch electrodes of the touch screen 130 connect to one touch sensitive processing apparatus. The touch sensitive processing apparatus utilizes capacitive sensing principles to detect whether an external object approaches or touches the touch button 130 via the button electrodes. When an external object is detected, the touch sensitive processing apparatus would report it to an operating system run by the central processing unit. Or alternatively, the touch sensitive processing apparatus may trigger special designed circuits to perform a corresponding function.

Because the touch screen needs to connect to electronic apparatus in the lower part via a pivotal mechanism joining the upper and the lower parts, wires connecting to the touch electrodes of the touch buttons 130 and the touch screen 120 are usually arranges as wire harnesses along edges of the upper part for connecting to the touch sensitive processing apparatus. In the embodiment as shown in FIG. 1, a wire harness 135 connecting the touch buttons 130A and 130B is arranged internally along the right edge of the touch screen 120. A protective layer outside the wire harness 135 may include a non-conductive glass layer and/or plastic material.

When an external conductive object touching a position 199 near the wire harness 135, the wire harness 135 is electromagnetic interfered such that the touch sensitive processing apparatus determines that an external conductive object approaches or touches the touch button 130.

Person having ordinary skill in the art can understand that although the embodiment as shown in FIG. 1 is a laptop computer, the present application can be applicable to other kinds of electronic systems 100 such as tablet computers or smartphones etc. As long as the electronic system 100 includes a wire harness of the touch button is arranged alongside of a touch screen or panel and it is prone to be electromagnetic interfered, the interference resistance technology provided by the present application is applicable to.

Figure 2:
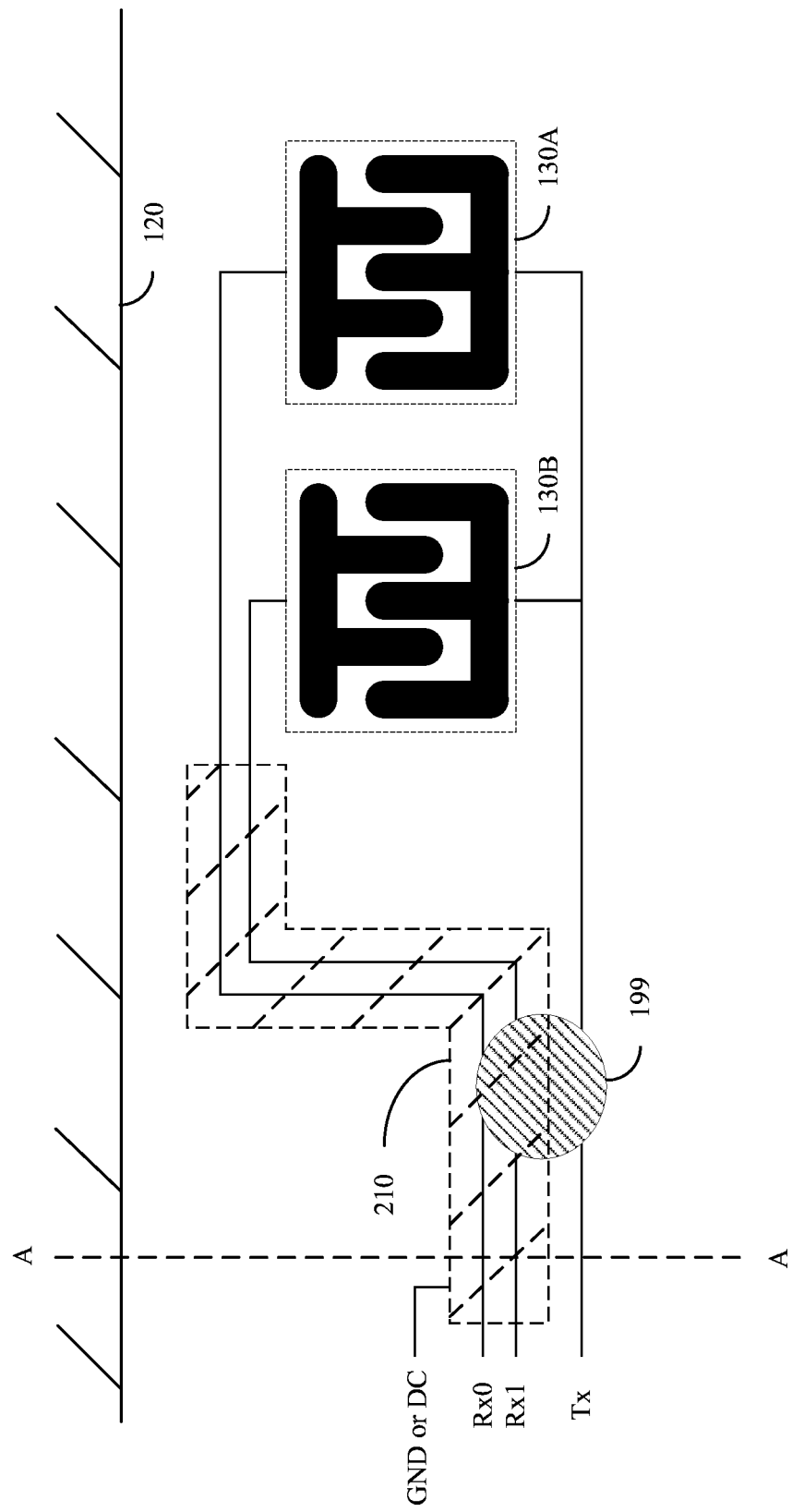
FIG. 2 illustrates a diagram of a part of wire harness of an electronic system 100 in accordance with an embodiment of the present application.

Please refer to FIG. 2, which illustrates a diagram of a part of wire harness of an electronic system 100 in accordance with an embodiment of the present application. An upper part of FIG. 2 is a touch area of a touch screen or panel 120. There are unshown multiple touch electrodes in the touch area. The touch electrodes may include multiple first electrodes in parallel to a first axis and multiple second electrodes in parallel to a second axis. The first electrodes may be arranged in a first electrode layer, the second electrodes may be arranged in a second electrode layer. The first and the second electrode layers are overlaid vertically. These first electrodes intersect with the second electrodes. They are not electrically coupled to each other. The touch sensitive processing apparatus may provide driving signals via the first electrodes and sense induced driving signals via the second electrodes and determine whether there is capacitive changes caused by an external object such that a position of the external object can be detected.

The touch buttons 130A and 130B comprise an upper button electrode and a lower button electrode which interleaves each other, respectively. The lower first button electrodes of the touch buttons 130A and 130B are jointly connected to a driving circuit of the touch sensitive processing apparatus via a circuit or a wire Tx. The upper second button electrode of the touch button 130A connects to a sensing circuit of the touch sensitive processing apparatus via a circuit or a wire Rx0. Similarly, the upper second button electrode of the touch button 130B connects to the sensing circuit of the touch sensitive processing apparatus via a circuit or a wire Rx1.

The driving circuit transmits the driving signals via the lower first button electrode of the touch button 130A via the driving wire Tx. The sensing circuit sense the induced driving circuit of the upper second button electrode of the touch button 130A via the sensing wire Rx0. When an external conductive object approaches or touches the touch button 130A, the sensing circuit would detect capacitive changes of the induced driving signals of the second electrode via the sensing wire Rx0. Thus, the touch sensitive processing apparatus would be notified that the touch button 130A is touched accordingly. Similarly, when an external conductive object approaches or touches the touch button 130B, the sensing circuit would detect capacitive changes of the induced driving signals of the second button electrode via the sensing wire Rx1. Thus, the touch sensitive processing apparatus would be notified that the touch button 130B is touched accordingly.

In the embodiment as shown in FIG. 2, a conductive layer 210 may be arranged above the sensing wires Rx of the wire harness 135. The conductive layer 210 is positioned in between an external conductive object and the sensing wires Rx. The conductive wire 210 may be connected to a direct-current (DC) voltage. The DC voltage may be a ground voltage.

Figure 4:
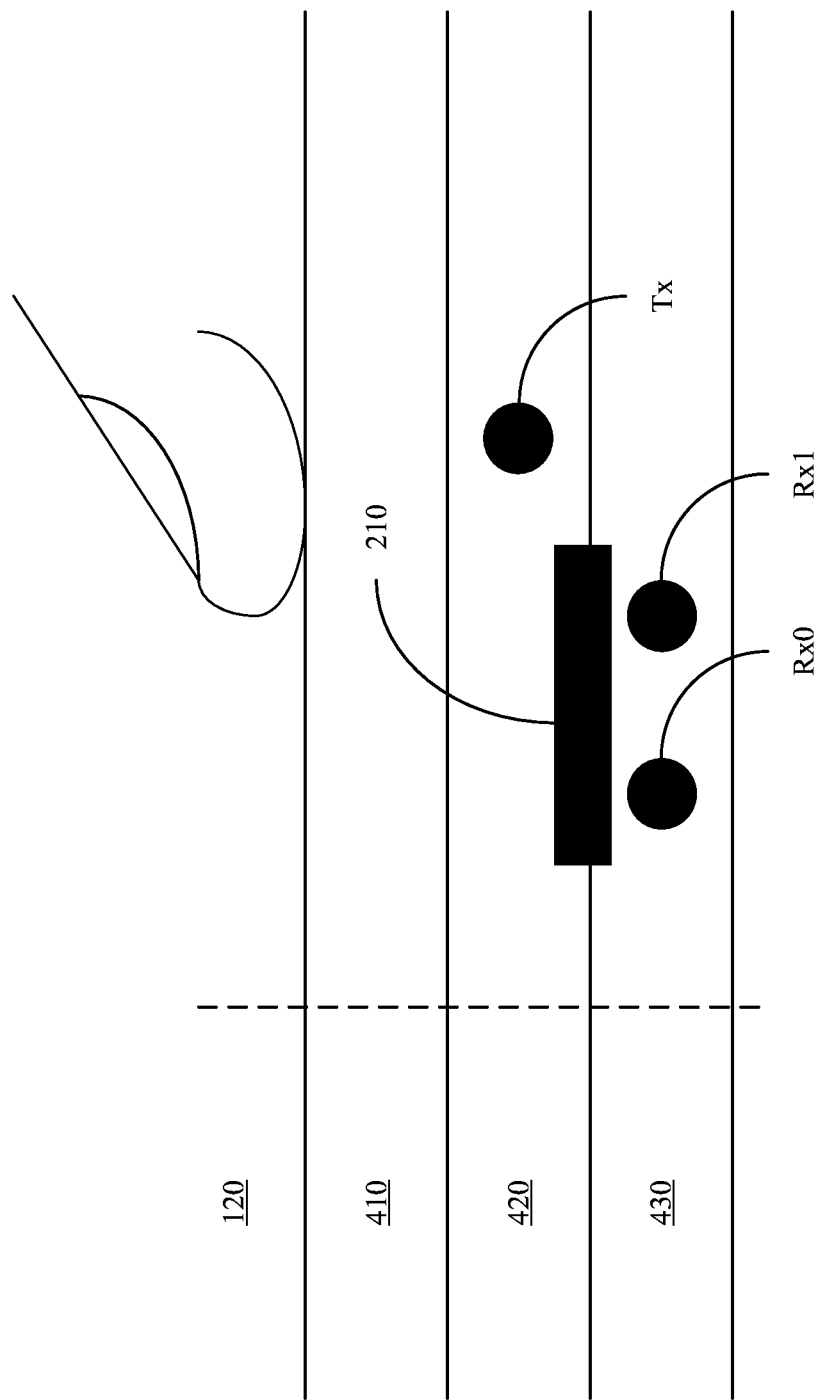
FIG. 4 illustrates a sectional diagram of the AA line of the embodiment as shown in FIG. 2.

Please refer to FIG. 4, which illustrates a sectional diagram of the AA line of the embodiment as shown in FIG. 2. The touch screen or panel 120 comprises a first electrode layer 420 and a second electrode layer 430. It may further comprise at least one non-conductive glass layer and/or protective layer 410 above the first electrode layer 420. The first electrode layer 420 includes the driving wire Tx. The second electrode layer 430 includes the sensing wires Rx0 and Rx1. The conductive layer 210 is arranged above the sensing wires Rx. When the sectional diagram is applied to the embodiment as shown in FIG. 2, the conductive layer 210 may be connected to a DC voltage. The DC voltage may be a ground voltage.

In additional to the driving signals from the driving wire Tx, the external object may further induce driving signals from the touch screen 120. The driving signal may cause electromagnetic interference to the sensing wires Rx via the external object. Person having ordinary skill in the art can understand that although the embodiment as shown in FIGS. 2 and 4 includes the conductive layer 210 with one single sheet, the present application may be applied to variants which includes the conductive layer 210 with multiple sheets which are connected to a DC voltage so as they can prevent the external object causing electromagnetic interferences to the sensing wires Rx.

Figure 3:
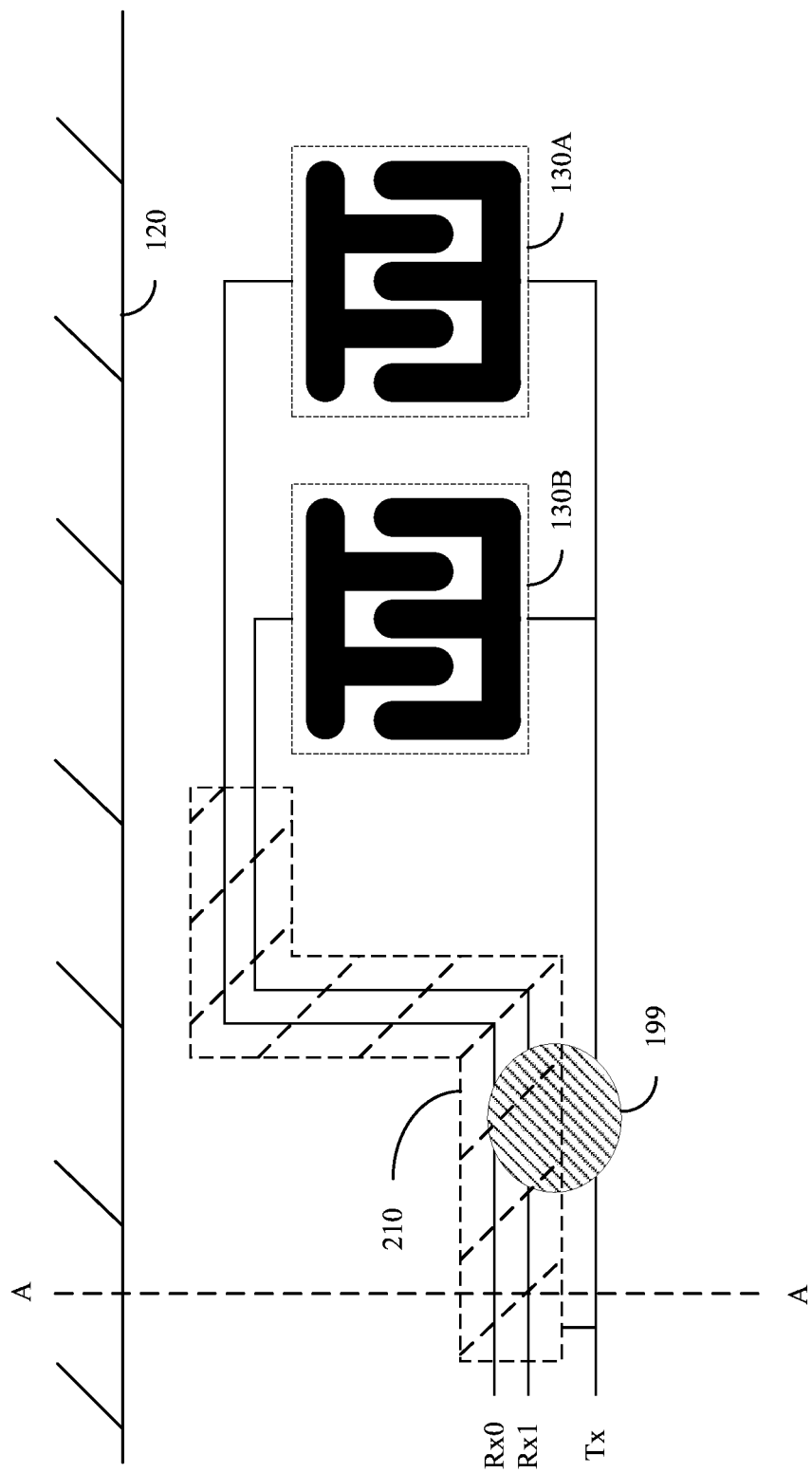
FIG. 3 depicts a diagram of a wire harness of an electronic system 100 according to another embodiment of the present application.

Please refer to FIG. 3, which depicts a diagram of a wire harness of an electronic system 100 according to another embodiment of the present application. A difference to the embodiment as shown in FIG. 2 is that the conductive layer 210 is shorted to the driving wire Tx as shown in FIG. 3.

Please refer to FIG. 4 again, which may be also a sectional diagram of the AA line of the embodiment as shown in FIG. 3. When the driving wire Tx and the conductive layer 210 are shorted, the external conductive object cannot be interposed in between the conductive layer 210 and the sensing wire Rx. Hence, it can prevent the external conductive object causing electromagnetic interferences to the sensing wires Rx.

Figure 5:
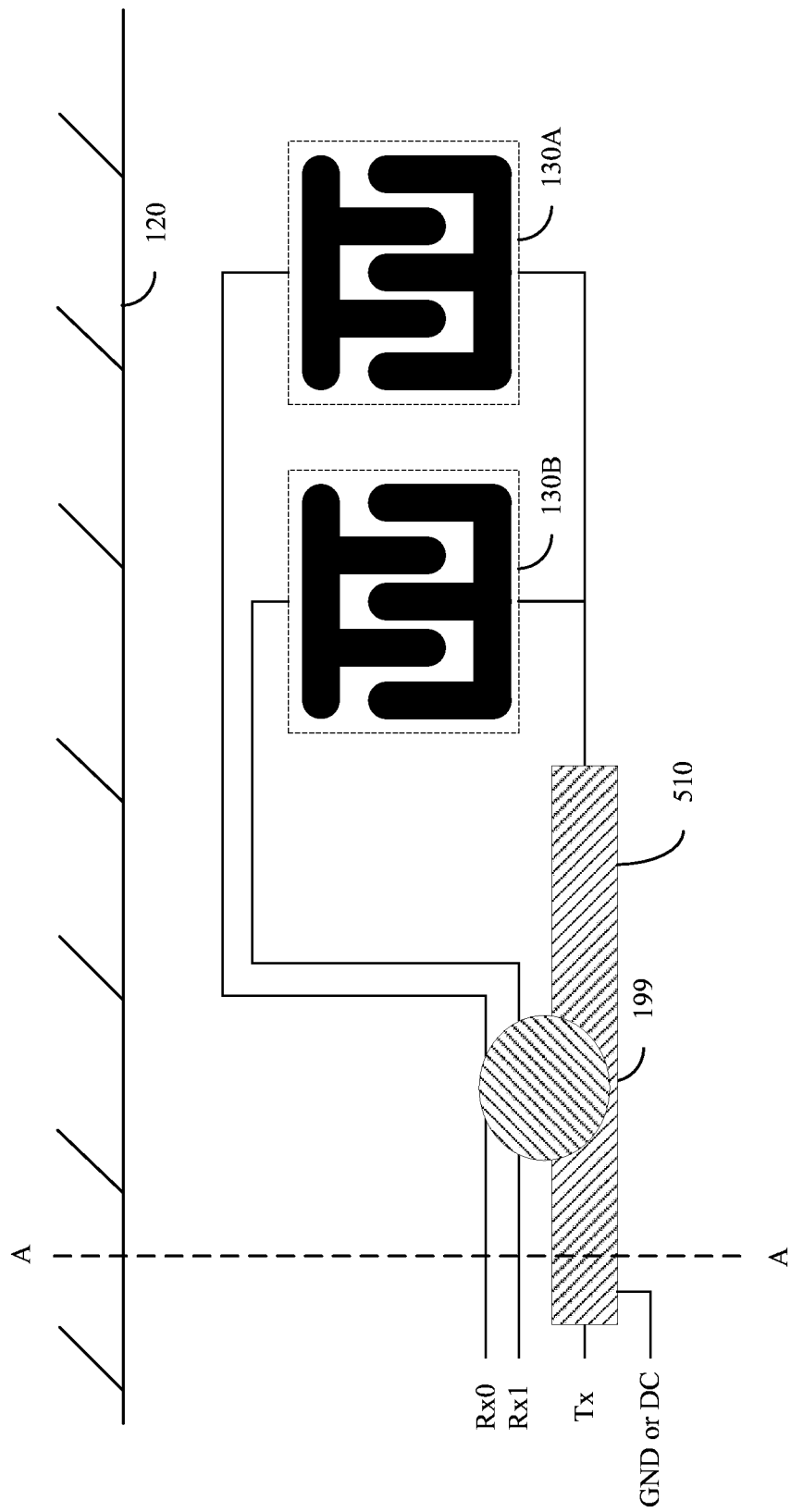
FIG. 5 depicts a diagram of a wire harness of an electronic system 100 according to an alternative embodiment of the present application.

Please refer to FIG. 5, which depicts a diagram of a wire harness of an electronic system 100 according to an alternative embodiment of the present application. Please refer to FIG. 6, which illustrates a sectional diagram of the AA line of the embodiment as shown in FIG. 5. In the embodiment of the FIG. 6, the second electrode layer 430 is arranged above the first electrode layer 420 which is contrary to the embodiment as shown in FIG. 4. There is a conductive layer 510 above the driving wire Tx of the first electrode layer 420 coupled to a DC voltage. The DC voltage may be a ground voltage. The conductive layer 510 may be used to prevent the external conductive object inducing the driving signals emitted from the driving wire Tx. Furthermore, it prevents the external conductive object cause electromagnetic interferences to the sensing wires Rx.

Figure 6:
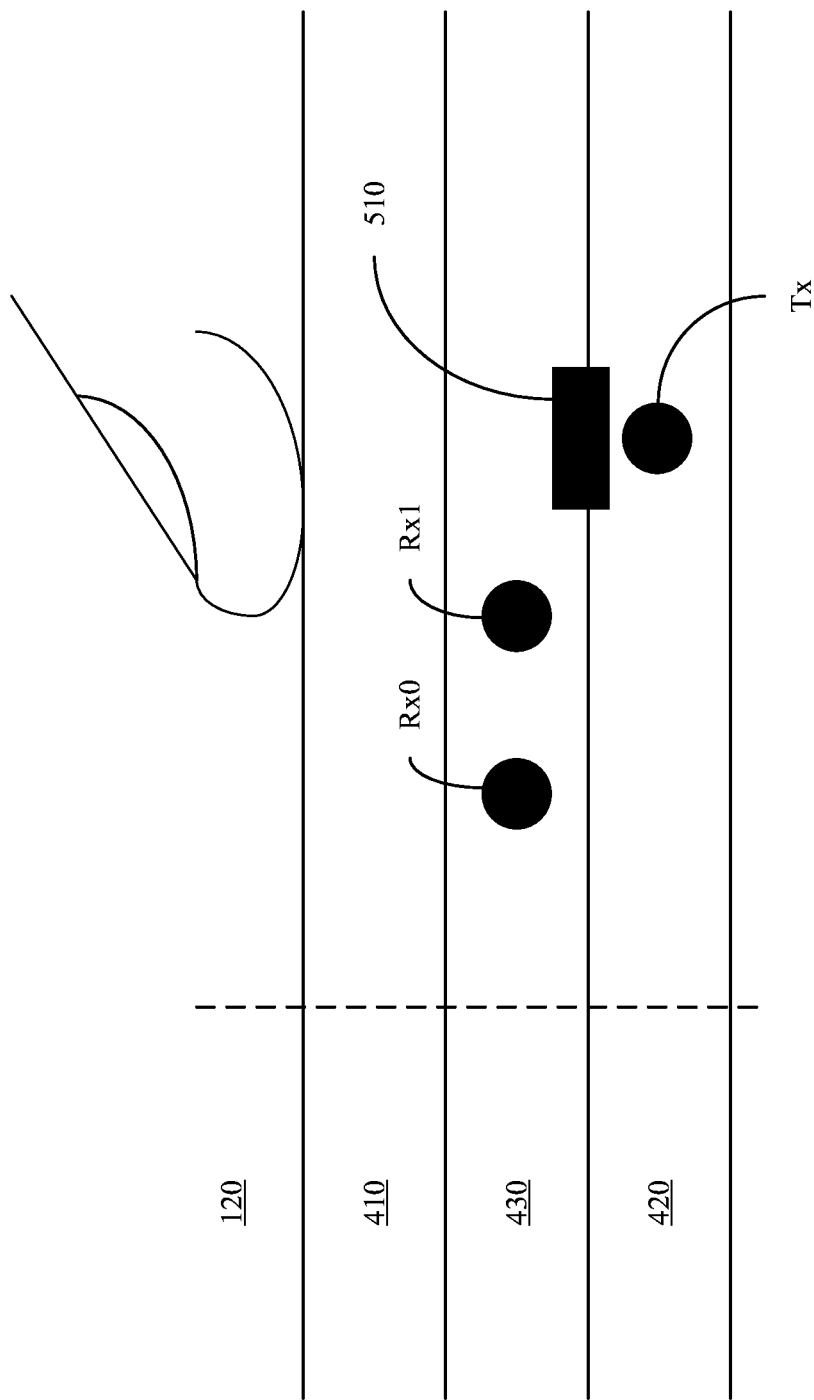
FIG. 6 illustrates a sectional diagram of the AA line of the embodiment as shown in FIG. 5.

Although in the embodiment as shown in FIG. 6, the conductive layer 510 is interposed between the second electrode layer 430 and the first electrode layer 420, as long as the conductive layer 510 is positioned in between the driving wire Tx and the external conductive object, it can prevent the external conductive object inducing the driving signals emitted from the driving wire Tx.

Figure 7:
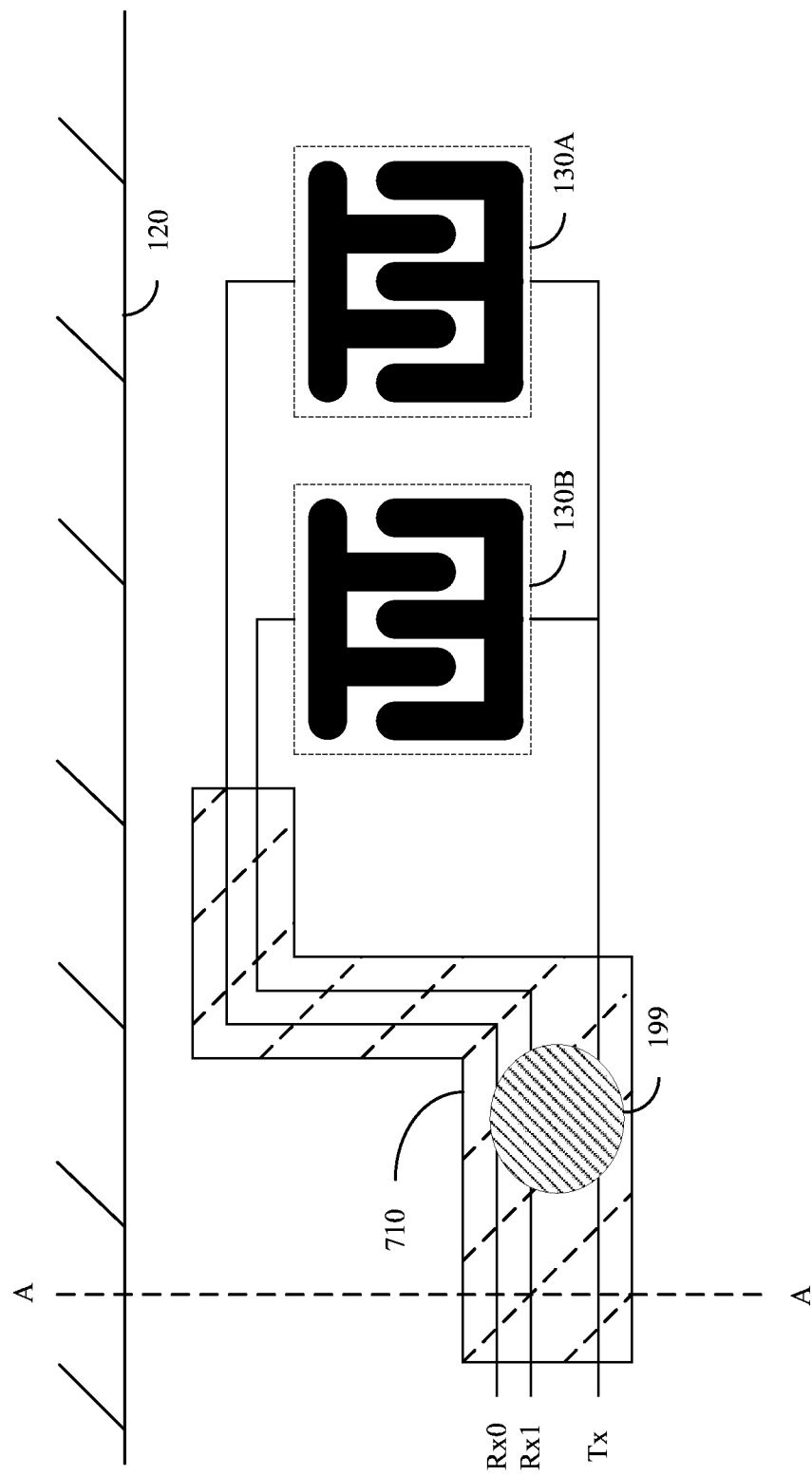
FIG. 7 depicts a diagram of a wire harness of an electronic system 100 according to an alternative embodiment of the present application.

Please refer to FIG. 7, which depicts a diagram of a wire harness of an electronic system 100 according to an alternative embodiment of the present application. In the embodiment as shown in FIG. 7, one or more conductive layers 710 are positioned above the wire harness. The voltage of the one or more conductive layers 710 are floating so as they can prevent the external conductive object inducing the driving signals emitted from the driving wire Tx.

Figure 8:
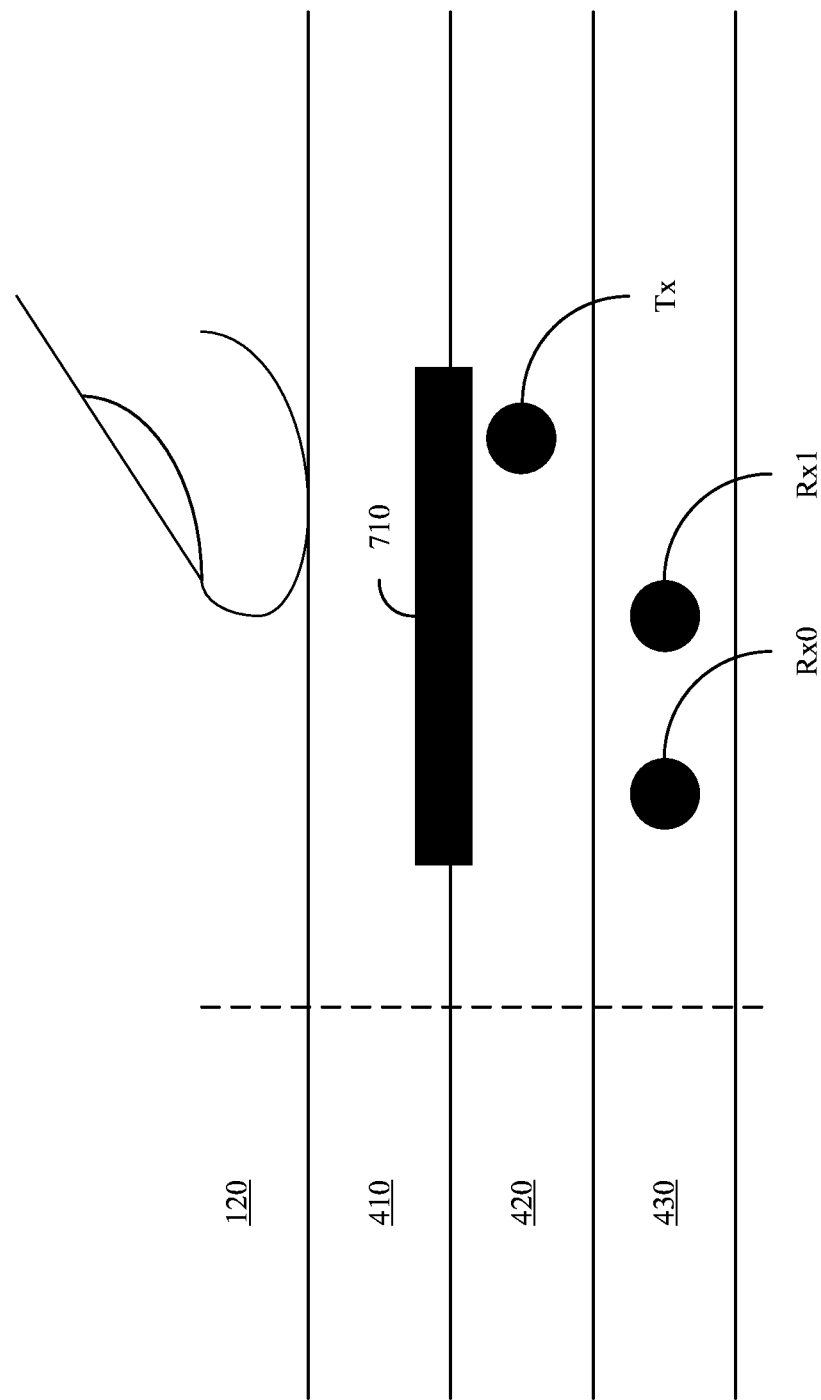
FIG. 8 illustrates a sectional diagram of the AA line of the embodiment as shown in FIG. 7.

Please refer to FIG. 8, which illustrates a sectional diagram of the AA line of the embodiment as shown in FIG. 7. In the embodiment as shown in FIG. 8, the first electrode layer 420 of the touch sensitive structure is on top of the second electrode layer 430. Appearance of an external conductive object does not affect mutual capacitance effects between the driving wire Tx and the sensing wire Rx.

Figure 9:
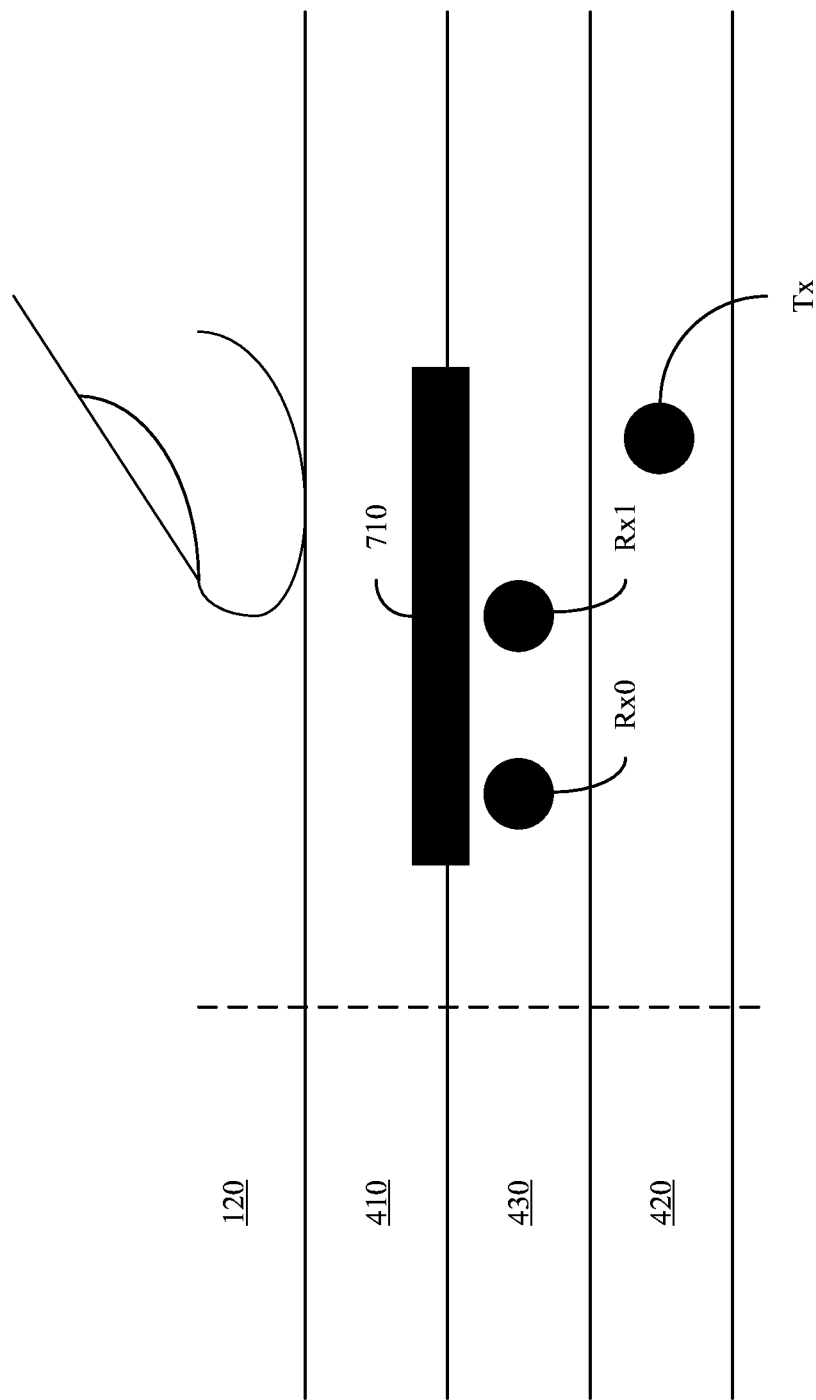
FIG. 9 illustrates a sectional diagram of the AA line of the embodiment as shown in FIG. 7.

Please refer to FIG. 9, which also illustrates a sectional diagram of the AA line of the embodiment as shown in FIG. 7. In the embodiment as shown in FIG. 9, the first electrode layer 420 of the touch sensitive structure is under the second electrode layer 430. Similarly, appearance of an external conductive object does not affect mutual capacitance effects between the driving wire Tx and the sensing wire Rx.

Figure 10:
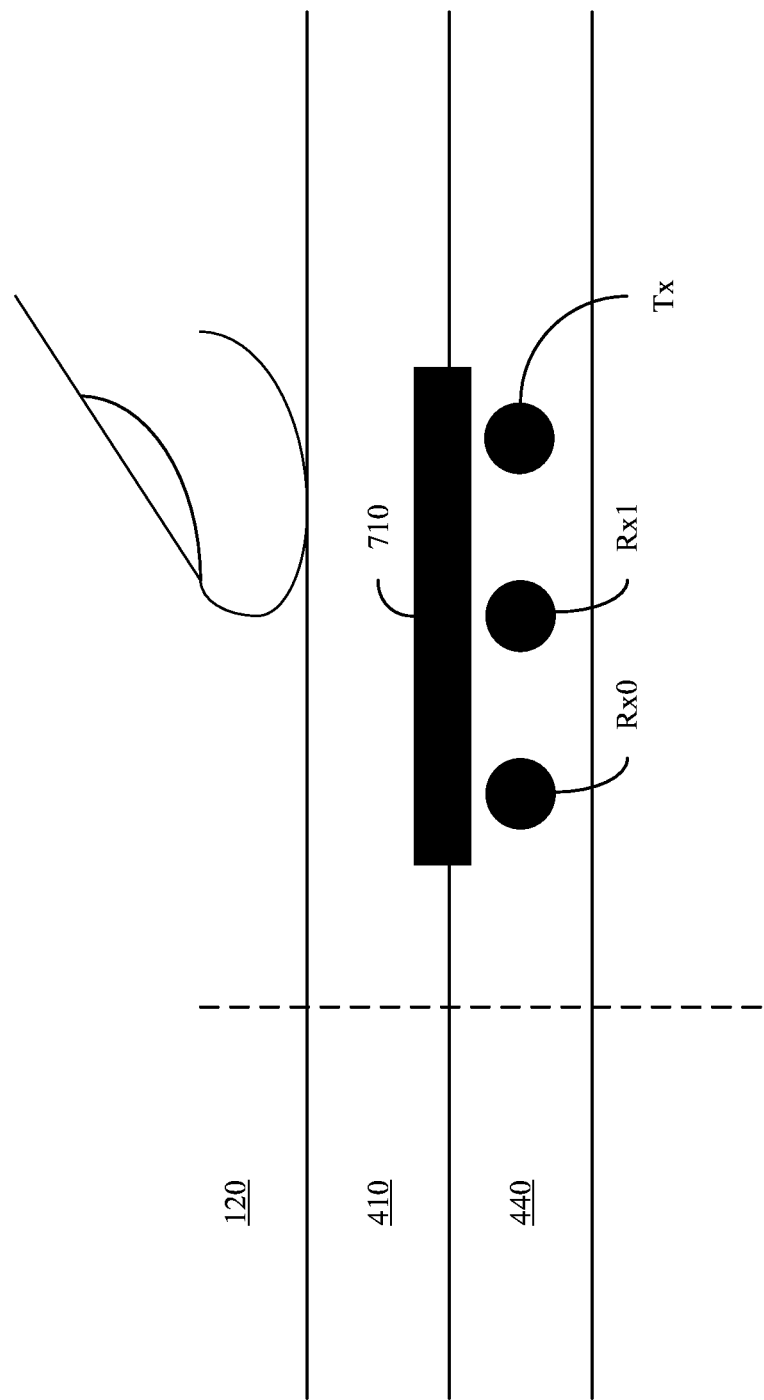
FIG. 10 illustrate a sectional diagram of the AA line of the embodiment as shown in FIG. 7.

Please refer to FIG. 10, which may illustrate a sectional diagram of the AA line of the embodiment as shown in FIG. 7. In the embodiment as shown in FIG. 10, the touch sensitive structure comprises one single electrode layer 440 including the first electrodes and the second electrodes. One or more conductive layers 710 are arranged above a part of the wire harness 135. Voltage of the conductive layer 710 may be floating or the conductive layer 710 may be connected to a DC voltage. The one or more conductive layer 710 can prevent the external conductive object inducing the driving signals emitted from the driving wire Tx. Hence, appearance of an external conductive object does not affect mutual capacitance effects between the driving wire Tx and the sensing wire Rx.

In the touch sensitive structures as shown in FIGS. 8 and 9, two electrode layers are included, respectively. However, in one embodiment of the present application, it can include one single electrode layer in which the first and the second electrodes can comprise multiple conductive sheets interconnected by bridging, respectively.

Please refer to FIG. 10, which may illustrate a sectional diagram of the AA line of the embodiment as shown in FIG. 7. In the embodiment as shown in FIG. 10, the touch sensitive structure comprises one single electrode layer 440 including the first electrodes and the second electrodes. One or more conductive layers 710 are arranged above a part of the wire harness 135. Voltage of the conductive layer 710 may be floating or the conductive layer 710 may be connected to a DC voltage. The one or more conductive layer 710 can prevent the external conductive object inducing the driving signals emitted from the driving wire Tx. Hence, appearance of an external conductive object does not affect mutual capacitance effects between the driving wire Tx and the sensing wire Rx.

Figure 11:
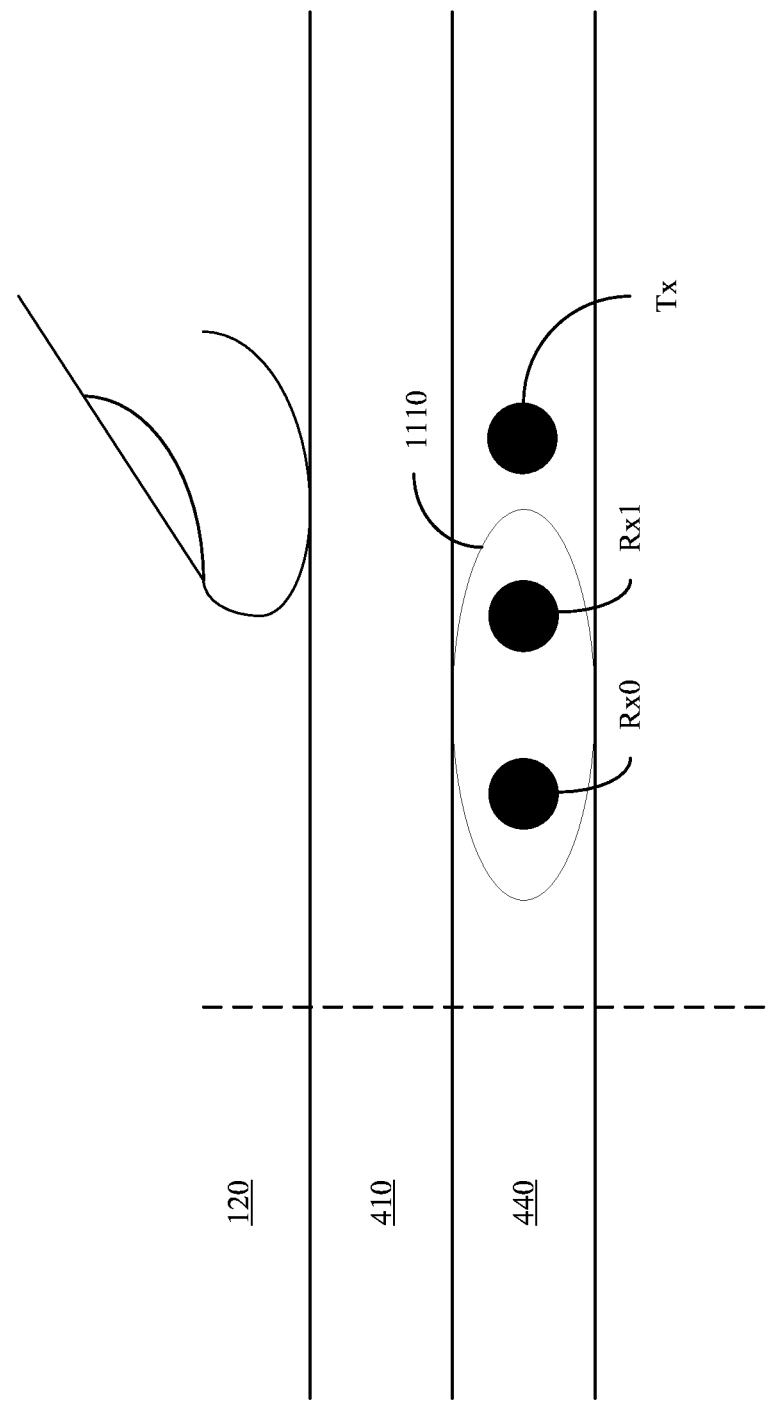
FIG. 11 depicts a sectional diagram of a touch sensitive structure in accordance with an embodiment of the present application.

Please refer to FIG. 11, which depicts a sectional diagram of a touch sensitive structure in accordance with an embodiment of the present application. In the embodiment as shown in FIG. 11, the touch sensitive structure comprises a single electrode layer 440 including the first electrodes and the second electrodes. One or more rolls of conductive materials 1110 may be used to enclose the one or more sensing wires Rx. Voltage of the one or more rolls of conductive materials 1110 may be connected to a DC voltage. Hence, appearance of an external conductive object does not affect mutual capacitance effects between the driving wire Tx and the sensing wire Rx.

Please refer back to FIG. 1, when one of the embodiments as shown in FIG. 2 through FIG. 11 is applied to a touch sensitive structure of a part of wire harness 135, an external conductive object approaching or approximating the wire harness 135 would not cause electromagnetic interference to the sensing wires Rx. The touch sensitive processing apparatus would not wrongly determine that there is an external conductive object touching the touch button 130A and/or 130B.

Figure 12:
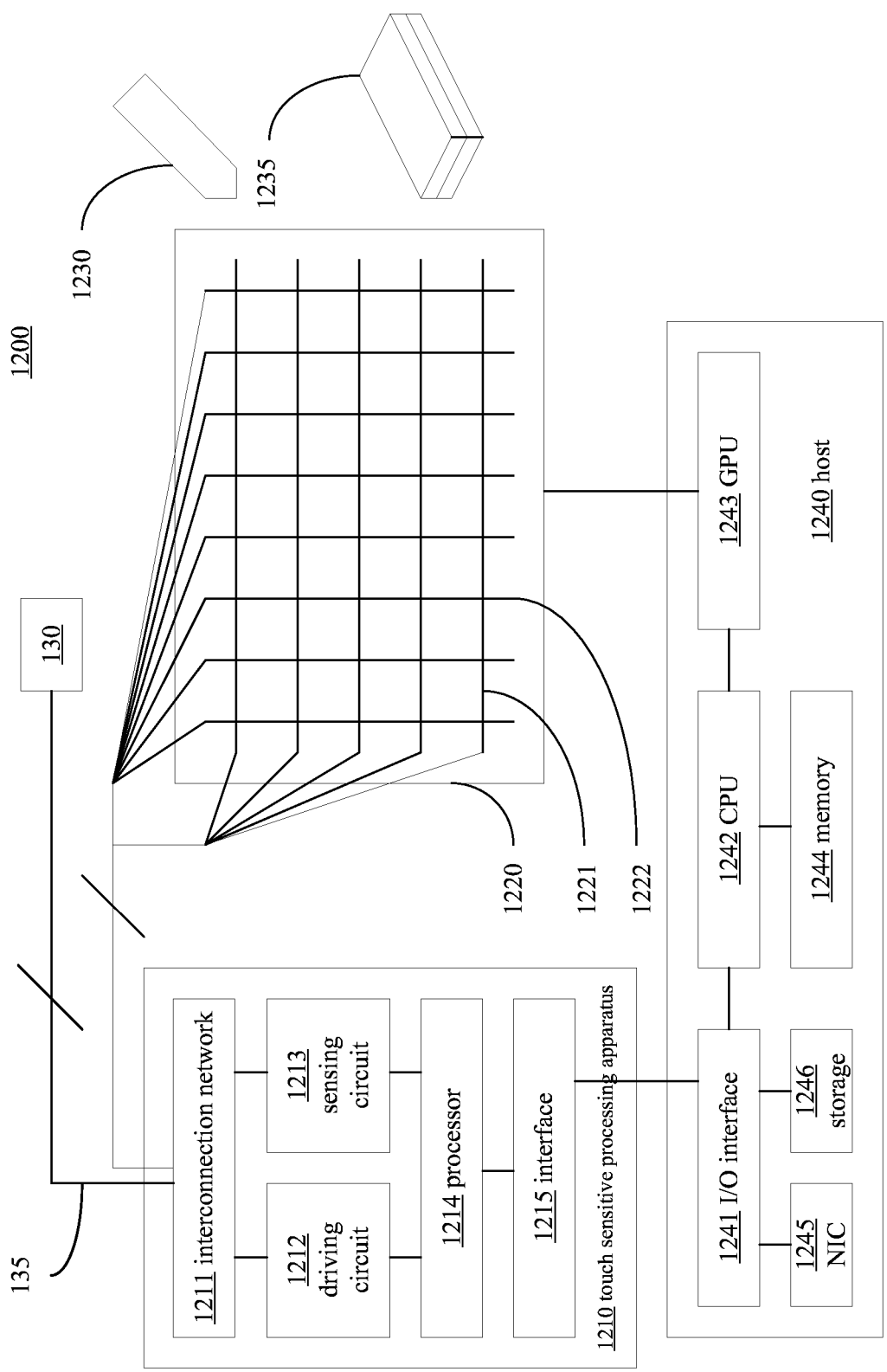
FIG. 12 depicts a block diagram of an electronic system 1200 in accordance with an embodiment of the present application.

Please refer to FIG. 12, which depicts a block diagram of an electronic system 1200 in accordance with an embodiment of the present application. The electronic system 1200 may be a common desktop, laptop, tablet personal computer, industrial control computer, smartphone or any other computer system having touch sensitive function. In one embodiment, the electronic system 1200 may be a variant of the electronic system 100 as shown in FIG. 1.

The touch system 1200 may comprise a touch sensitive processing apparatus 1210, a touch panel or screen 1220 or the touch screen 120 as shown in FIG. 1 coupled to the touch sensitive processing apparatus, and a host 1240 coupled to the touch sensitive processing apparatus 1210. The electronic system 1200 may further comprises one or more styli 1230 and/or touch board eraser 1235. Besides edges of the touch screen 1220, there may be one or more touch button 130.

The touch screen 1220 may comprise multiple first electrodes 1221 in parallel to a first axis and multiple second electrodes 1222 in parallel to a second axis. The first electrodes 1221 may intersect with the second electrodes 1222 in order to form multiple sensing points or sensing areas. Equivalently, the second electrodes 1222 may intersect with the first electrodes 1221 in order to form multiple sensing points or sensing areas. In some embodiments of the present application, the first electrodes 1221 may be referred as first touch electrodes 1221 and the second electrodes 1222 may be referred as second touch electrodes 1222. The first electrodes 1221 and the second electrodes 1222 may be collectively referred as touch electrodes. In some embodiments, the first electrodes 1221 and the second electrodes 1222 are made by transparent material. When applicable to the touch screen 120 of the embodiment as shown in FIG. 1, The first electrodes 1221 and the second electrodes 1222 may be disposed in one electrode layer. Conductive plates of each one of the first electrodes 1221 or the second electrodes 1222 may be connected by bridging. The first electrodes 1221 and the second electrodes 1222 may be disposed at different overlapping electrode layers. Unless described specifically, the present application may be applied to the embodiments having one or more electrode layers. The first axis and the second axis are perpendicular in most cases. However, the present application does not limit that the first axis and the second axis are perpendicular. In one embodiment, the first axis may be a horizontal axis or a pixel refreshing axis of the touch screen 1220.

The touch sensitive processing apparatus 1210 may comprise following hardware circuit: an interconnection network module 1211, a driving circuit module 1212, a sensing circuit module 1213, a processor module 1214, and an interface module 1215. The touch sensitive processing apparatus 1210 may be implemented inside a single integrated circuit which may include one or more chips. It may use multiple integrated circuits and an interconnected circuit board carried the multiple integrated circuits to realize the touch sensitive processing apparatus 1210. The touch sensitive processing apparatus 1210 may be implemented in single integrated circuits with the host 1240. The present application does not limit how to implement the touch sensitive processing apparatus 1210.

The interconnection network module 1211 is configured to connect each of the multiple first electrodes 1221 and/or the multiple second electrodes 1222 of the touch screen 1220. The interconnection network module 1211 may follow control command of the processor module 1214 for connecting the driving circuit module 1212 and any one or more touch electrodes and for connecting the sensing circuit module 1213 and any one or more touch electrodes. The interconnection network module 1211 may include a combination of one or more multiplexers (MUX) to realize functions. Already discussed, the interconnection network module 1211 may connect to one or more first button electrodes of the one or more touch buttons 130 via a common driving wire Tx. The interconnection network module 1211 may connect to one or more second button electrodes of the one or more touch buttons 130 via sensing wires Rx, respectively.

The driving circuit module 1212 may comprise clock generator, frequency divider, frequency multiplier, phase lock loop, power amplifier, DC-DC voltage converter, regulator and/or filter, which is configured to provide driving signal to any one or more touch electrodes via the interconnection network module 1211 according to control commands of the processor module 1214. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 1212 may include one or more channel. Each channel may be connected to any one or more touch electrodes and one or more first button electrodes of the one or more touch buttons 130 via the interconnection network module 1211.

The sensing circuit module 1213 may comprise integrator, sampler, clock generator, frequency divider, frequency multiplier, phase lock loop, power amplifier, operational amplifier, multiplier, DC-DC voltage converter, regulator and/or filter, which is configured to sense on any one or more touch electrodes and second button electrodes via the interconnection network module 1211 according to control commands of the processor module 1214. When the touch signal is transmitted from one of the touch electrodes, another touch electrode may induce the touch signal. And the sensing circuit module 1213 may demodulate the induced touch signal by another touch electrode in accordance with the modulation method performed on the driving signal by the driving circuit module 1212 in order to restore the messages carried by the driving signal. The sensing circuit module 1213 may include one or more channels. Each channel may be connected to any one or more touch electrodes via the interconnection network module 1211. At the same time, each channel may simultaneously perform sensing and demodulation. Similarly, when the touch signal is emitted from the first button electrode, the second button electrode may induce the touch signal. And the sensing circuit module 1213 may demodulate the induced touch signal by the second button electrode in accordance with the modulation method performed on the driving signal by the driving circuit module 1212 in order to restore the messages carried by the driving signal and to determine whether the touch button including the second button electrode is pressed or not.

In one embodiment, the driving circuit module 1212 and the sensing circuit module 1213 may include analog front-end (AFE) circuits. In another embodiment, in additional to the AFE circuits, the driving circuit module 1212 and the sensing circuit module 1213 may include digital back-end (DBE) circuits. If the driving circuit module 1212 and the sensing circuit module 1213 include only the AFE circuits, the DBE circuits may be implemented in the processor module 1214.

The processor module 1214 may include a digital signal processor for connecting the AFE circuits or the DBE circuits of the driving circuit module 1212 and the sensing circuit module 1213, respectively. The processor module 1214 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 1211, the driving circuit module 1212, the sensing circuit module 1213 and the interface module 1215 of the touch sensitive processing apparatus 1210. For examples, the processor module 1214 may comprises processors widely adopted in the industry such as 8051 series, Intel i960 series, ARM Cortex-M series and etc. The present application does not limit types and numbers of processor cores included in the processor module 1214.

The instructions and data may be used to implement each of steps mentioned in the present application and flows and methods constructed by the steps. Some instructions may be executed independently inside the processor module 1214, for examples, arithmetic and log operation instructions. Other instructions may be used to control other circuits of the touch sensitive processing apparatus 1210. These instructions may include input/output interfaces of the processor module 1214 to control other circuits. Other circuits may provide information via the input/output interface of the processor module 1214 to the OS and/or application programs executed by the processor module 1214. Persons having ordinary skill in the art should have common knowledge of computer organization and architecture which enabling them to understand that the flows and methods provided by the present application can be realized by the circuits and the instructions.

The interface module 1215 may include kinds of serial or parallel bus, such as universal serial bus (USB), I²C, peripheral component interconnect (PCI), PCI-Express, IEEE 1394 and other industrial standard input/output interface. The touch sensitive processing apparatus 1210 connects to the host 1240 via the interface module 1215.

The electronic system 1200 may comprise one or more styli 1230 and/or touch board erasers 1235. The stylus 1230 and touch board eraser 1235 may be transmitters which emit electrical signals. The transmitters may include active transmitter which actively emits electrical signals or passive transmitters which emit electrical signals in response to external electrical signals. The stylus 1230 and touch board eraser 1235 may comprise one or more electrodes which is configured to receive electrical signals from the touch screen 1220 synchronously or asynchronously, or to transmit electrical signals to the touch screen 1220 synchronously or asynchronously. The electrical signals may be modulated according to one or more of the aforementioned modulation methods.

The stylus 1230 or touch board eraser 1235 may be conductor which is configured to transmit driving signals or to be grounded via user's hand or body. The stylus 1230 or touch board eraser 1235 may be physically or wirelessly connected to an I/O interface 1241 of the host 1240 or any other interfacing circuits of the I/O interface 1241.

The touch sensitive processing apparatus 1210 may detect one or more external objects such as fingers, palms or passive styli 1230 or touch board erasers 1235, or active styli 1230 or touch board erasers 1235 emitting electrical signals via the touch screen 1220. The touch sensitive processing apparatus 1210 may utilize mutual-capacitance sensing or self-capacitance sensing to detect external conductive objects. The styli 1230 or touch board erasers 1235 and touch sensitive processing apparatus 1210 may use the aforementioned modulation and demodulation methods to transmit message via the electrical signals. The touch sensitive processing apparatus 1210 may detect one or more positions where the styli 1230 or touch board erasers 1235 touch or approach the touch screen 1220, status or sensors (pressure sensor or button) onboard the stylus 1230 or touch board eraser 1235, orientation angle or inclination angle of the stylus 1230 or touch board eraser 1235 with respect to the touch screen 1220 and etc. according to the electrical signals. The touch sensitive processing apparatus may detect whether an external conductive object touches the touch button 130 via the first and the second button electrodes of the touch button 130.

The host 1240 is a main apparatus for controlling the electronic system 1200. It may comprise an input/output interface module 1241 for connecting the interface module 1215, a central processing unit (CPU) module 1242, a graphics processor module 1243, a memory module 1244 connects to the CPU module 1242, a network interface module 1245 and a storage 1246 module connect to the input/output interface module 1241.

The storage module 1246 comprises non-volatile memory. Common examples are hard disks, electronic erasable rewritable read only memory (EEPROM), or flash memory. The storage module 746 may store normal operating system and application programs executable under the operating system. The network interface module 1245 may comprise wired or wireless hardware network interface. The network interface module 1245 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 1242 may directly or indirectly connects to the input/output interface module 1241, the graphics processor module 1243, the memory module 1244, the network interface module 1245 and the storage module 1246. The CPU module 1242 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 1242 is able to control other circuits of the electronic system 1200.

The optional graphics processor (GPU) module 1243 is usually configured to handle computations with respect to graphics outputs. The graphics processor module 1243 may connect to the touch screen 1220 for controlling outputs of the touch screen 1220. In some applications, the host 1240 may have the CPU module 1242 execute the computations with respect to graphics outputs, without dedicated handling of the graphics processor module 1243.

The host 1240 may comprise components or apparatus not shown in FIG. 12, for example, audio input/output interface, keyboard input interface, mouse input interface, track-ball input interface and/or any other hardware circuits. Persons having ordinary skill in the art should have common knowledge of computer organization and architecture. They can understand the electronic system 1200 disclosed by the present application is exemplary. Parts regarding to the inventive feature provided by the present application should be referred to the specification and the claims.

Figure 13:
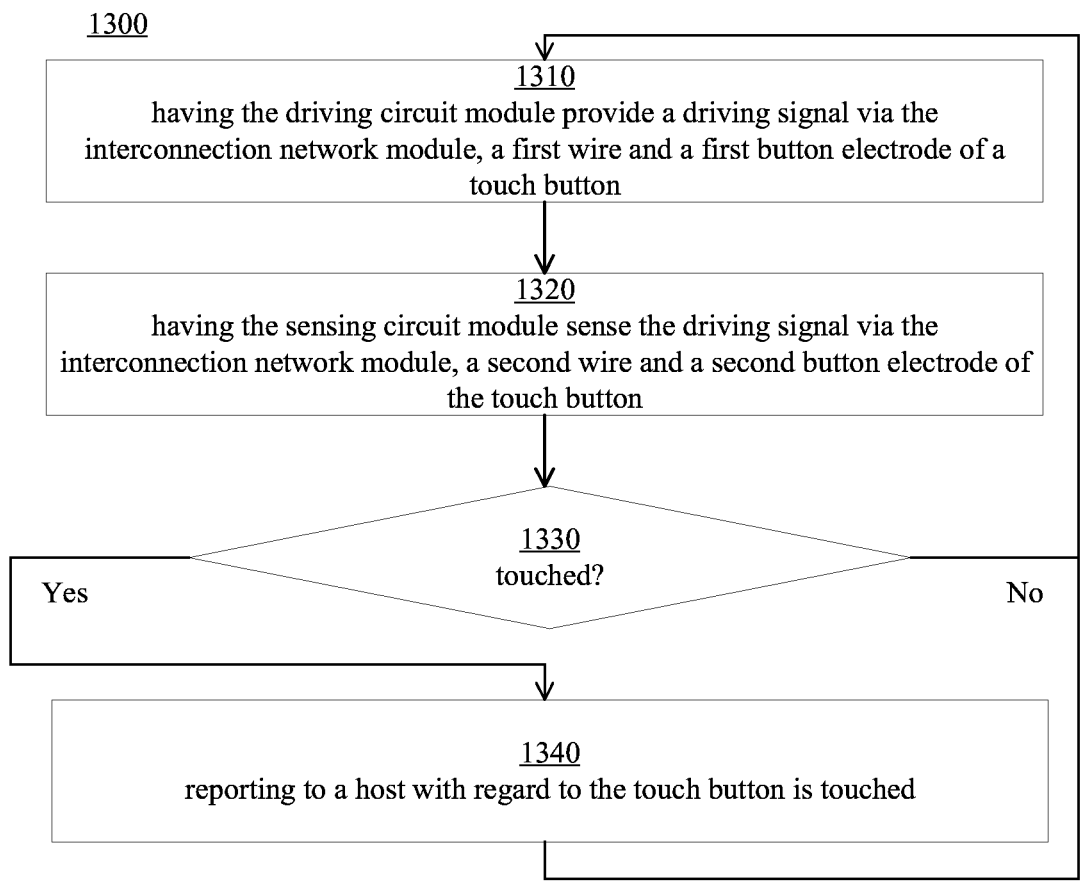
FIG. 13 depicts a flowchart diagram of a touch sensitive processing method 1300 in accordance with an embodiment of the present application.

Please refer to FIG. 13, which depicts a flowchart diagram of a touch sensitive processing method 1300 in accordance with an embodiment of the present application. The touch sensitive processing method 1300 may be applicable to the electronic system 1200, especially to the processor module 1214 of the touch sensitive processing apparatus 1210. The touch sensitive processing method 1300 may be implemented as instructions and data stored in non-volatile memory being executed by the processor module 1214 to be realized. If there is no causal relation between two steps, the present application does not limit execution order of these two steps. The touch sensitive processing method 1300 may begin at step 1310.

Step 1310: having the driving circuit module provide a driving signal via the interconnection network module, a first wire and a first button electrode of a touch button. In a variant, it also can include having the driving circuit module provide the driving signal via the interconnection network module, the first wire and a third button electrode of a second touch button.

Step 1320: having the sensing circuit module sense the driving signal via the interconnection network module, a second wire and a second button electrode of the touch button. In a variant, it also can include having the sensing circuit module sense the driving signal via the interconnection network module, a fourth wire and a fourth button electrode of the touch button.

Step 1330: based on changes of the sensed driving signals from the second button electrode and/or the fourth button electrode, determining whether the touch button and/or the second touch button are being touched, respectively. If any one of the touch buttons is touched, the flow proceeds to step 1340. Otherwise, the flow returns to step 1310.

Step 1340: reporting to a host with regard to the touch button is touched.

According to an embodiment, a touch sensitive structure is provided. The touch sensitive structure, comprising: a first electrode layer, further comprises multiple first electrodes in parallel to a first axis in a touch area; a second electrode layer, further comprises multiple second electrodes in parallel to a second axis in the touch area; a touch button outside of the touch area, the touch button further comprises a first button electrode in the first electrode layer and a second button electrode in the second electrode layer, wherein a shape and a position of the first button electrode are corresponding to the second button electrode; a first wire, in the first electrode layer and outside the touch area, for connecting the first button electrode; a second wire, in the second electrode layer and outside the touch area; and a conductive layer being arranged in between an external conductive object on top of the touch sensitive structure and at least one of following: the first wire; and the second wire.

Preferably, in order to prevent the second wire being electromagnetic interfered by the external conductive object, wherein when the first wire is closer to the external conductive object than the second wire, the conductive layer is arranged in between the external conductive object and the second wire, the conductive layer is not arranged in between the external conductive object and the first wire.

Preferably, in order to prevent the electromagnetic interferences from the external conductive object, wherein the conductive layer is connected to a direct current voltage.

Preferably, in order to prevent the electromagnetic interferences from the external conductive object, wherein the conductive layer is electrically coupled to the first wire.

Preferably, in order to prevent the electromagnetic interferences from the external conductive object, wherein when the conductive layer is arranged in between the external conductive layer and the first and the second wires, voltage of the conductive layer is floating.

Preferably, in order to detect the second touch button simultaneously, the touch sensitive structure further comprises: a second touch button, outside the touch area, further includes a third button electrode in the first electrode layer and a fourth button electrode in the second electrode layer; a fourth wire, in the second electrode layer and outside the touch area, for connecting the fourth button electrode, and wherein the first wire is further configured to connect the third button electrode, wherein the conductive layer is arranged in between the external conductive object and at least one combination of following: a first combination including the first wire; and a second combination including the second and the fourth wires.

Preferably, in order to prevent electromagnetic interferences from the external conductive object, wherein when the first combination is closer to the external conductive object than the second combination, the conductive layer is arranged in between the external conductive object and the second combination, the conductive layer is not arranged in between the external conductive object and the first combination.

Preferably, in order to prevent the electromagnetic interferences from the external conductive object, wherein the conductive layer is connected to a direct current voltage.

Preferably, in order to prevent the electromagnetic interferences from the external conductive object, wherein the conductive layer is electrically coupled to the first combination.

Preferably, in order to prevent the electromagnetic interferences from the external conductive object, wherein when the second combination is closer to the external conductive object than the first combination, the conductive layer is arranged in between the external conductive object and the first combination, the conductive layer is not arranged in between the external conductive object and the second combination, wherein the conductive layer is connected to a direct current voltage.

Preferably, in order to prevent the electromagnetic interferences from the external conductive object, wherein when the conductive layer is arranged in between the external conductive layer and the first and the second combinations, voltage of the conductive layer is floating.

According to an embodiment of the present application, a touch sensitive structure is provided. The touch sensitive structure, comprising: an electrode layer, which further comprises multiple first electrodes in parallel to a first axis and multiple second electrodes in parallel to a second axis in a touch area; a touch button outside the touch area, which further comprises a first button electrode and a second button electrode in the electrode layer, wherein a shape and a position of the first button electrode are corresponding to the second button electrode; a first wire, outside the touch area and in the electrode layer, for connecting to the first button electrode; a second wire, outside the touch area and in the electrode layer, for connecting to the second button electrode; and a conductive layer, being arranged in between an external conductive object on top of the touch sensitive structure and the first and the second wires.

Preferably, in order to prevent electromagnetic interference from the external conductive object, the touch sensitive structure further comprises: a second touch button outside the touch area, which further comprises a third button electrode and a fourth button electrode in the electrode layer, wherein a shape and a position of the third button electrode are corresponding to the fourth button electrode; and a fourth wire, outside the touch area and in the electrode layer, for connecting to the fourth button electrode, wherein the first wire is further configured for connecting to the third button electrode, wherein the conductive layer is arranged in between the external conductive object and the first, the second, and the fourth wires.

According to an embodiment of the present application, a touch sensitive processing apparatus is provided for controlling the touch sensitive structure. The touch sensitive processing apparatus, comprising: an interconnection network for connecting to the first electrodes, the second electrodes, the first wire, and the second wire; a driving circuit module, configured for providing a driving signal via the interconnection network, the first wire and the first button electrode; a sensing circuit module, configured for sensing the driving signal via the interconnection network, the second wire and the second button electrode; and a processor module, configured for executing instructions stored in non-volatile memory to realize: determining whether the touch button is being touched based on changes of the driving signal sensed by the sensing circuit module.

According to an embodiment of the present application, a touch sensitive processing apparatus is provided for controlling the touch sensitive structure. The touch sensitive processing apparatus, comprising: an interconnection network for connecting to the first electrodes, the second electrodes, the first wire, and the fourth wire; a driving circuit module, configured for providing a driving signal via the interconnection network, the first wire and the third button electrode; a sensing circuit module, configured for sensing the driving signal via the interconnection network, the fourth wire and the fourth button electrode; and a processor module, configured for executing instructions stored in non-volatile memory to realize: determining whether the second touch button is being touched based on changes of the driving signal sensed by the sensing circuit module.

According to an embodiment of the present application, an electrode system is provided. The electronic system comprises the touch sensitive structure and the touch sensitive processing apparatus.

Preferably, the electronic system further comprises a host for controlling the electronic system, wherein the processor module is further configured for reporting to the host when it is determined that the touch button is touched.

According to an embodiment of the present application, a touch sensitive processing method is provided for controlling the touch sensitive structure. The touch sensitive processing method comprising: providing a driving signal via the interconnection network, the first wire and the first button electrode; sensing the driving signal via the interconnection network, the second wire and the second button electrode; and determining whether the touch button is being touched based on changes of the driving signal sensed by the sensing circuit module.

According to an embodiment of the present application, a touch sensitive processing method is provided for controlling the touch sensitive structure. The touch sensitive processing method comprising: providing a driving signal via the interconnection network, the first wire and the third button electrode; sensing the driving signal via the interconnection network, the fourth wire and the fourth button electrode; and determining whether the second touch button is being touched based on changes of the driving signal sensed by the sensing circuit module.

Preferably, the touch sensitive processing method further comprises reporting to a host when it is determined that the touch button is touched.

The present application provides a mechanism to enhance interference resistance for protecting a wire harness of a touch button. It prevents the touch sensitive processing apparatus receives wrong instruction when a finger is placed on top of the wire harness.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive structure, comprising:
   a first electrode layer, further comprises multiple first electrodes in parallel to a first axis in a touch area;
   a second electrode layer, further comprises multiple second electrodes in parallel to a second axis in the touch area;
   a touch button outside of the touch area, the touch button further comprises a first button electrode in the first electrode layer and a second button electrode in the second electrode layer, wherein a shape and a position of the first button electrode are corresponding to the second button electrode;
   a first wire, in the first electrode layer and outside the touch area, for connecting the first button electrode;
   a second wire, in the second electrode layer and outside the touch area; and
   a conductive layer being arranged in between a finger on top of the touch sensitive structure and the second wire, wherein the conductive layer is not arranged in between the finger and the first wire, wherein the first wire is closer to the finger than the second wire.

2. The touch sensitive structure of claim 1, wherein the conductive layer is connected to a direct current voltage.

3. The touch sensitive structure of claim 1, wherein the conductive layer is electrically coupled to the first wire.

4. The touch sensitive structure of claim 1, further comprises:
   a second touch button, outside the touch area, further includes a third button electrode in the first electrode layer and a fourth button electrode in the second electrode layer; and
   a fourth wire, in the second electrode layer and outside the touch area, for connecting the fourth button electrode, and
   wherein the first wire is further configured to connect the third button electrode,
   wherein the conductive layer is arranged in between the finger
   and
   a second combination including the second and the fourth wires.

5. The touch sensitive structure of claim 4, wherein when the first wire is closer to the finger than the second combination, the conductive layer is arranged in between the finger and the second combination.

6. The touch sensitive structure of claim 5, wherein the conductive layer is connected to a direct current voltage.

7. The touch sensitive structure of claim 5, wherein the conductive layer is electrically coupled to the first wire.

8. A touch sensitive structure, comprising:
   an electrode layer, which further comprises multiple first electrodes in parallel to a first axis and multiple second electrodes in parallel to a second axis in a touch area;
   a touch button outside the touch area, which further comprises a first button electrode and a second button electrode in the electrode layer, wherein a shape and a position of the first button electrode are corresponding to the second button electrode;
   a second touch button outside the touch area, which further comprises a third button electrode and a fourth button electrode in the electrode layer, wherein a shape and a position of the third button electrode are corresponding to the fourth button electrode;
   a first wire, outside the touch area and in the electrode layer, for connecting to the first button electrode and the third button electrode;
   a second wire, outside the touch area and in the electrode layer, for connecting to the second button electrode;
   a fourth wire, outside the touch area and in the electrode layer, for connecting to the fourth button electrode;

a conductive layer, being arranged in between a finger on top of the touch sensitive structure and the first, the second, and the fourth wires.

9. A touch sensitive processing apparatus configured for controlling the touch sensitive structure of claim 1, wherein the touch sensitive processing apparatus comprising:
an interconnection network for connecting to the first electrodes, the second electrodes, the first wire, and the second wire;
a driving circuit module, configured for providing a driving signal via the interconnection network, the first wire and the first button electrode;
a sensing circuit module, configured for sensing the driving signal via the interconnection network, the second wire and the second button electrode; and
a processor module, configured for executing instructions stored in non-volatile memory to realize:
determining whether the touch button is being touched based on changes of the driving signal sensed by the sensing circuit module.

10. A touch sensitive processing apparatus is provided for controlling the touch sensitive structure of claim 4, wherein the touch sensitive processing apparatus, comprising:
an interconnection network for connecting to the first electrodes, the second electrodes, the first wire, and the fourth wire;
a driving circuit module, configured for providing a driving signal via the interconnection network, the first wire and the third button electrode;
a sensing circuit module, configured for sensing the driving signal via the interconnection network, the fourth wire and the fourth button electrode; and
a processor module, configured for executing instructions stored in non-volatile memory to realize:
determining whether the second touch button is being touched based on changes of the driving signal sensed by the sensing circuit module.

11. An electronic system, comprising the touch sensitive structure and the touch sensitive processing apparatus of claim 9.

12. The electronic system of claim 11, further comprises a host for controlling the electronic system, wherein the processor module is further configured for reporting to the host when it is determined that the touch button is touched.

13. A touch sensitive processing method for controlling the touch sensitive structure of claim 1, comprising:
providing a driving signal via an interconnection network, the first wire and the first button electrode;
sensing the driving signal via the interconnection network, the second wire and the second button electrode; and
determining whether the touch button is being touched based on changes of the driving signal sensed by a sensing circuit module.

14. The touch sensitive processing method of claim 13, further comprises reporting to a host when it is determined that the touch button is touched.

15. A touch sensitive processing method for controlling the touch sensitive structure of claim 4, comprising:
providing a driving signal via an interconnection network, the first wire and the third button electrode;
sensing the driving signal via the interconnection network, the fourth wire and the fourth button electrode; and
determining whether the second touch button is being touched based on changes of the driving signal sensed by a sensing circuit module.

16. A touch sensitive processing apparatus configured for controlling the touch sensitive structure of claim 8, wherein the touch sensitive processing apparatus comprising:
an interconnection network for connecting to the first electrodes, the second electrodes, the first wire, and the second wire;
a driving circuit module, configured for providing a driving signal via the interconnection network, the first wire and the first button electrode;
a sensing circuit module, configured for sensing the driving signal via the interconnection network, the second wire and the second button electrode; and
a processor module, configured for executing instructions stored in non-volatile memory to realize:
determining whether the touch button is being touched based on changes of the driving signal sensed by the sensing circuit module.

17. An electronic system, comprising the touch sensitive structure and the touch sensitive processing apparatus of claim 16.

18. The electronic system of claim 17, further comprises a host for controlling the electronic system, wherein the processor module is further configured for reporting to the host when it is determined that the touch button is touched.

19. A touch sensitive processing method for controlling the touch sensitive structure of claim 8, comprising:
providing a driving signal via an interconnection network, the first wire and the first button electrode;
sensing the driving signal via the interconnection network, the second wire and the second button electrode; and
determining whether the touch button is being touched based on changes of the driving signal sensed by a sensing circuit module.

20. The touch sensitive processing method of claim 19, further comprises reporting to a host when it is determined that the touch button is touched.

* * * * *